Patented Feb. 21, 1933

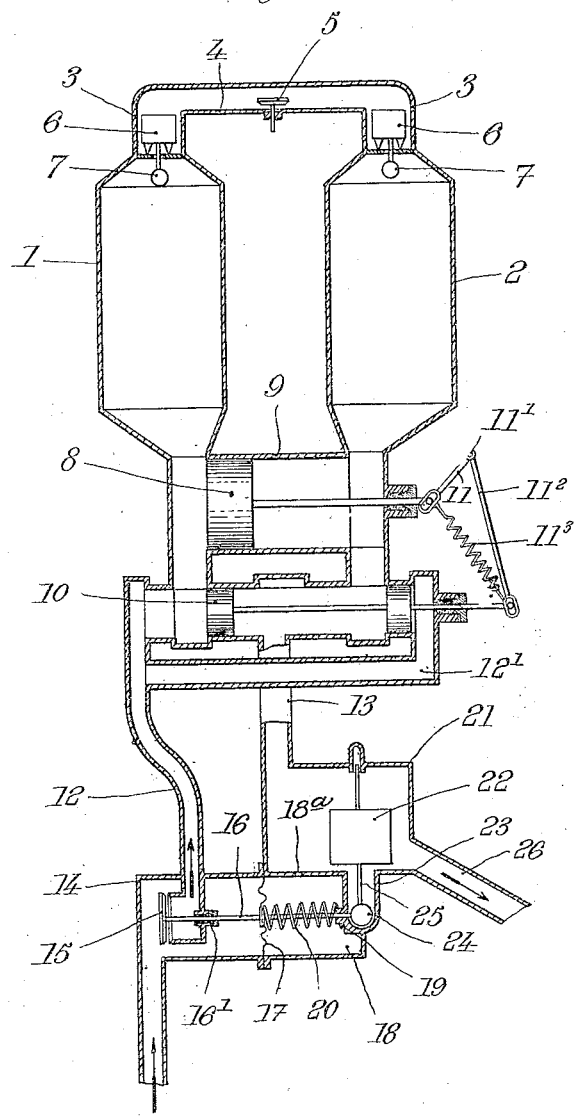

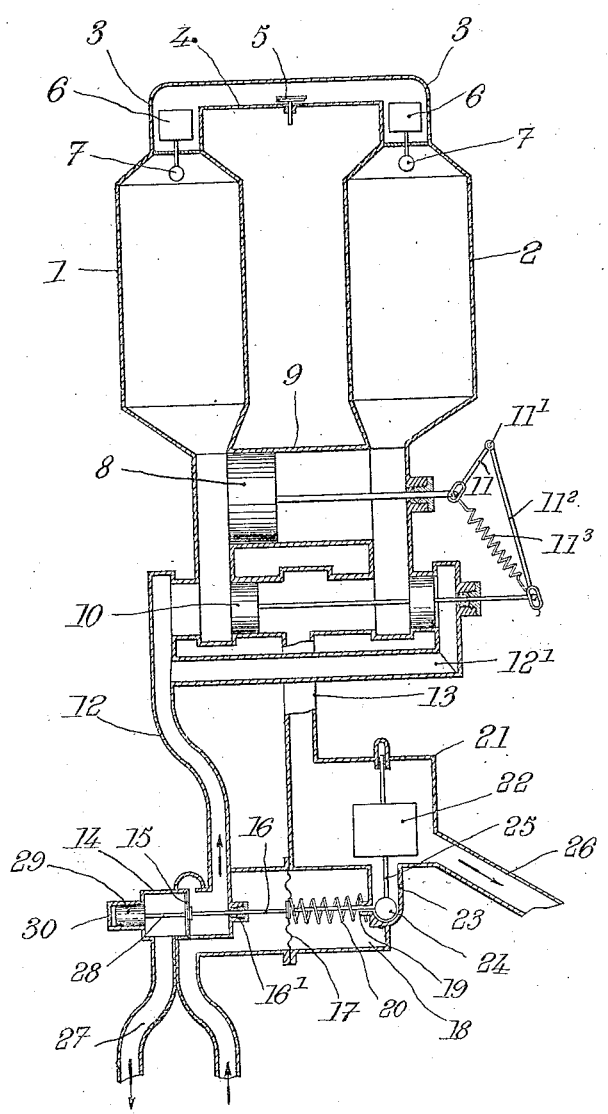

1,898,891

UNITED STATES PATENT OFFICE

RENÉ PORTE, OF LEVALLOIS-PERRET, FRANCE, ASSIGNOR TO SOCIÉTÉ HARDOLL (ETABLISSEMENTS HARIVEAU & DOLIMIER, ET RENÉ PORTE & CIE REUNIS), OF LEVALLOIS-PERRET, FRANCE

LIQUID MEASURING DEVICE

Application filed February 10, 1928, Serial No. 253,477, and in Belgium February 10, 1927.

The present invention relates to liquid measuring devices and, more particularly, to those of the type fitted with a pair of measuring reservoirs functioning alternately to receive and deliver fixed quantities of liquid.

One of the objects of the invention is to provide means for preventing the feed of liquid to the reservoir about to be filled as long as liquid remains in the reservoir being emptied.

Further objects will appear in the course of the detailed description now to be given with reference to the accompanying drawings, in which:

Fig. 1 shows, in vertical section, one constructive embodiment of the invention;

Fig. 2 is diagrammatic section through a second form of the invention.

Referring to Fig. 1 of the drawings, there is shown a pair of measuring tanks 1 and 2 of equal capacity fitted at their upper portions with float chambers 3 which intercommunicate through a pressure equalizing conduit 4 provided with an air valve 5 opening inwardly. A pair of floats 6, each carrying a valve 7, are mounted in float chambers 3 and control the orifices separating the latter from reservoirs 1 and 2. The bottoms of each of the measuring reservoirs communicate with the opposite ends of the cylinder 9 of an automatic reversing mechanism comprising a piston diaphragm 8 slidably mounted in the cylinder 9, and with the chamber of a double piston valve 10 mounted parallel to piston 8 and controlling the feed to and the discharge of liquid from each reservoir. A lever 11 is arranged to pivot about a fixed point $11^1$. A second lever $11^2$ is pivoted on $11^1$, and a compression spring $11^3$ is connected to the free ends of the levers $11^1$ and $11^2$ and functions (1) to store energy during the movement of piston 8 from either of its extreme positions and (2) to abruptly force pistons 10 from one extreme position to the other slightly before piston 8 passes its dead point. The movement of pistons 8 and 10 is limited in both directions by suitable shoulders or stops (not shown) provided inside their respective cylinders, or, if so desired, exteriorly thereof, It is to be understood that the reversing system above-described does not form the novel part of the present invention and that it may be varied at will or replaced by any equivalent combination of elements. A feed conduit 12, $12^1$ supplies liquid to be measured to either of the reservoirs according to the position of piston valve 10, and a discharge conduit 13 simultaneously receives liquid from the rservoir not being charged. The lower or inlet end of conduit 12 opens into a chamber 14. The opening may be closed by a closure or valve member 15 which is mounted on a rod or stem 16 which passes through a liquid-tight orifice 16' in the lower end of the conduit 12, and then through a flexible liquid-tight diaphragm 17 to which it is rigidly connected, and finally through a liquid-tight slideway 19. A spring 20, whose tension is sufficient to maintain the diaphragm 17 normally in an undistorted position so that the valve 15 is held open, is located around the rod 16 between the diaphragm and the wall of the slideway 19. The discharge conduit 13 opens into a chamber 21 mounted above the wall of the slideway 19, and is connected to the outlet 26 for the liquid. A float 22 fixed to a stem 25 is located in the chamber 21, and is raised by the liquid being discharged through this chamber. The stem 25 extends into the chamber 23, a portion of the walls of which are provided with a slideway 19. A ball abutment 24 is fixed on the lower end of the stem 25, so that when the float 22 is lowered, the ball 24 is located in the path of the leftward movement of the rod 16, and hence the valve 15 is maintained open.

The above described assembly functions in the following manner:—Assuming that reservoir 1 is being charged and reservoir 2 discharged (i. e. the position shown in Fig. 1 for each of the operating elements except float 22), liquid flows from a pump (not shown) into chamber 14, past valve 15, into conduit 12 and then into reservoir 1. The air forced out of the latter and into conduit 4 passes around the float 6 of reservoir 2 and into this reservoir where it functions to hasten the discharge of liquid from reservoir 2. As soon as the liquid level rises high enough to elevate float 6 at the top of tank 1, the corresponding valve 7 seats and causes the liquid pressure inside 1 to increase. This increased pressure is transmitted to piston diaphragm 8 and the latter moves from left to right until the various elements designated by the character 11 act on piston valve 10 so that the latter moves abruptly from right to left. The device will then have reversed the feed of fuel from reservoir 1 over to reservoir 2. Simultaneously discharge will begin from charged reservoir 1.

It will be noted that, in the event that the rate of feed from the liquid supply pump is greater than the rate of discharge of the reservoirs, tank 1 will be filled before tank 2 has time to completely discharge (and, of course, the reverse), thus causing what may be termed "superposition" at the moment that reversal takes place. It is, therefore, necessary to arrest the supply of liquid from the pump until feed and discharge are in proper adjustment. This is accomplished by the assembly connected to the feed and discharge conduits. If, for example, tank 1 becomes filled while tank 2 is still discharging, the pressure inside tank 1 will be transmitted to diaphragm 17, which is adjusted to respond to lower pressures than piston 8 and the distortion of the former will close valve 15. The feed of liquid to conduit 12 and tank 1 will then be arrested. As the pump is continued in operation, the back pressure increases, and the operator observes that a reversal has not occurred. The pump movement is then stopped, and leakage losses in the pump, or the provision of the auxiliary return conduit 27 (Fig. 2), permit the return of diaphragm 17 and therewith a re-opening of the valve 15. So long, however, as liquid is being discharged and the float 22 is raised, this valve will immediately be closed when the pump is re-started. As soon as the tank 2 is empty and the float 22 has dropped so that the ball abutment 24 moves downward, then if the valve 15 is open, further pump pressure cannot close the valve 15 as the stem 16 is blocked by the abutment 24; and the pressure from the pump is now transmitted through the filling conduit 12 to operate the reversing mechanism. If the valve 15 is closed when the float 22 moves to its lowest position, then upon cessation of the pump movement, the pressure in the conduit from the pump to the valve 15 will rapidly drop, owing to leakeage and/or the relief through the return pipe 27, so that the pressure against the diaphragm 17 will soon permit the movement of the rod 16 toward the left, and then the abutment 24 assumes the position shown in Fig. 1, and then a further movement of the pump will cause a reversal. During the time that tank 2 is completing its discharge, float 22 gradually descends thus bringing ball 24 back into position immediately in line with rod 16.

To assure free play of flexible membrane 17, the inside of chamber 18, containing part of rod 16 and spring 20, is arranged to be under atmospheric pressure by the open communicating hole 18ª, while, any possible entry of liquid from valve chamber 23 being prevented by carefully packing slideway 19.

To prevent possible battering ram effects to be produced when valve 15 closes, a return conduit 27 may be added to the device as shown in Fig. 2. This conduit communicates at its free end (not shown) with the intake side of the pump and is normally closed by valve 15 when the latter is in open position relatively to conduit 12. When valve 15 closes conduit 12 it simultaneously opens communications to conduit 27. This form of the invention functions, otherwise, in all respects like the apparatus shown in Fig. 1.

It is advantageous to provide a braking action on the movement of diaphragm 17 in both forms of the invention hereinabove described. A very convenient way of accomplishing this is to provide also a dash-pot 30 and a piston 29 in line with and connected to the rod 16 as shown in Fig. 2.

What I claim is:—

1. A liquid dispensing device comprising a plurality of reservoirs, filling and discharge conduits connected to the said reservoirs, a reversing element located between said reservoirs and said conduits for alternately controlling the admission of liquid to the reservoirs and the emptying of the latter, each of said reservoirs having an air escape, individual means for closing said air escapes and operated upon the complete filling of the corresponding reservoir whereby a liquid super-pressure may be built up in said reservoir and said filling conduit, a valve located in the filling conduit for closing the same, a first element responsive to the pressure of the liquid in said filling conduit and means connecting the same with said reversing element whereby said reversing element is operated upon the existence of super-pressure in said filling conduit, a second element responsive to the pressure of the liquid in said filling conduit and means connecting the same to said valve whereby to close the valve upon the existence of super-pressure in said filling conduit, an element responsive to the liquid level in the discharge conduit, and an abutment controlled by the liquid level responsive element and moved thereby into the path of the connecting means of said second element when the liquid level responsive element is in its position of low liquid level in said discharge conduit.

2. A dispensing device according to claim 1, in which the liquid level responsive element comprises a float.

3. A dispensing device according to claim 1, in which the valve is a selective three-way valve, and a return conduit is connected thereto so that said valve may selectively establish communication through said filling conduit and valve to the reversing element or from the filling conduit to said return conduit while closing the passage to said reversing element.

4. A liquid dispensing device comprising a plurality of reservoirs, a filling conduit and a discharge conduit connected to said reservoirs, a reversing element interposed between said reservoirs and conduits and means for operating said reversing element for controlling the supply of liquid to said reservoirs and the discharge of liquid out of said reservoirs, a float in the discharge conduit, an abutment fixed to said float, each of said reservoirs having an air escape and means for closing the said air escape upon the filling of the corresponding reservoir so that a super-pressure may be built up in the reservoir and filling conduit, an element responsive to the pressure of the liquid in the filling conduit, a valve located on the filling conduit for closing the same, and means connecting said valve and said pressure responsive element for closing the valve upon the existence of a super-pressure of liquid in the filling conduit, said abutment being actuated by the float and presented thereby when the float is in its lowered position to prevent the closing of said valve.

5. A liquid dispensing device comprising a plurality of reservoirs, a filling conduit and a discharge conduit connected to said reservoirs, a reversing element interposed between said reservoirs and conduits, and means for operating said reversing element for controlling the supply of liquid to said reservoirs and the discharge of liquid out of said reservoirs, a float in the discharge conduit, an abutment fixed to said float, each of said reservoirs having an air escape and means for closing said air escape upon the filling of the corresponding reservoir so that a super-pressure may be built up, a diaphragm having one of its faces subjected to the pressure of the liquid in the filling conduit, and means for controlling the supply of liquid in the filling conduit, the said means being controlled by the said diaphragm and by said abutment.

6. A liquid dispensing device comprising a plurality of reservoirs, a filling conduit and a discharge conduit connected to said reservoirs, a reversing element interposed between said reservoirs and conduits, and means for operating said reversing element for controlling the supply of liquid to said reservoirs and the discharge of liquid out of said reservoirs, a float in the discharge conduit, an abutment fixed to said float, each of said reservoirs having an air escape and means for closing the said air escape upon the filling of the corresponding reservoir so that a super-pressure may be built up, a diaphragm having one of its faces subjected to the pressure of the liquid in the filling conduit, and a closure means located on the filling conduit, the said closure means being connected to the said diaphragm to be closed thereby when the latter is operated by the liquid pressure, said abutment being operated by the float when said discharge conduit is emptied to prevent the closing of said closure means.

7. A dispensing device according to claim 6, in which said closure means comprises a closure and a stem fixed to the said closure and the said diaphragm, the said abutment co-acting with the end of the said stem.

8. A dispensing device according to claim 6, in which said closure means comprises a closure and a stem rigid with the said closure and with the said diaphragm, the said abutment co-acting with the end of said stem, and a spring tending to bring the said closure into its open position.

9. A dispensing device according to claim 6, comprising a return conduit branched from said filling conduit and controlled by said closure, the said closure means in its open position obstructing the said return conduit.

10. A dispensing device according to claim 6, in which said closure means comprises a closure and a stem rigid with the said closure and the said diaphragm, the said abutment co-acting with the end of the said stem, and a dash-pot device fastened to the stem and braking the movements of the latter.

In testimony whereof I have hereunto set my hand.

RENÉ PORTE.